United States Patent [19]

Golden et al.

[11] 4,087,284

[45] May 2, 1978

[54] COLOR-DEVELOPER COATING FOR USE IN COPY SYSTEMS

[75] Inventors: Ronald Golden, Mount Prospect; Allan H. Cohen, Evanston; David G. Eby, Chicago, all of Ill.

[73] Assignee: Champion International Corporation, Stamford, Conn.

[21] Appl. No.: 693,160

[22] Filed: Jun. 7, 1976

[51] Int. Cl.$^2$ ........................ C09D 11/00; B41M 5/16; B41M 5/22

[52] U.S. Cl. ........................................ 106/21; 106/32; 282/27.5; 427/150; 427/151; 427/152; 428/914

[58] Field of Search ............... 427/150, 151, 152, 153; 428/411, 913, 914, 323, 328, 329, 330, 331; 282/27.5; 106/20, 21, 14.5, 32

[56] References Cited

U.S. PATENT DOCUMENTS

| | | | |
|---|---|---|---|
| 3,896,255 | 7/1975 | Kato et al. | 428/411 |
| 3,928,702 | 12/1975 | Matsukawa et al. | 428/323 |
| 3,970,769 | 7/1976 | Kato et al. | 427/145 |

*Primary Examiner*—Thomas J. Herbert, Jr.
*Assistant Examiner*—Bruce H. Hess
*Attorney, Agent, or Firm*—Evelyn M. Sommer

[57] ABSTRACT

A process for preparing color-developer coatings in which an oily solution of an acidic, organic material is emulsified in water and an insoluble, particulate, oil-adsorbent material is dispersed in the emulsion. The resulting emulsion-dispersion may be coated onto a receptor such as a paper substrate or other receiving surface and dried. The product resulting from the process is an enhanced color-developer coating for use in pressure-sensitive copy systems.

13 Claims, No Drawings

COLOR-DEVELOPER COATING FOR USE IN COPY SYSTEMS

BACKGROUND OF THE INVENTION

The present invention relates to coatings and more particularly to a process for preparing color-developer materials useful as coatings in pressure-sensitive copy systems.

One type of pressure-sensitive copy paper produces a distinctive color in a region of localized pressure as a result of an acid-base reaction in the region. Generally, an electron-donating or basic, colorless, chromogenic compound reacts with an electron accepting or acidic material in the region through the medium of a oily, water-immiscible solvent.

This type of pressure-sensitive copy paper may consist of a transferring paper coated with a layer of microcapsules, containing an electron-donating, colorless chromogenic compound dissolved in an oily solvent, and juxtaposed receiving paper coated with a layer of an electron-accepting material and a suitable binder. When localized pressure is applied, e.g., by handwriting or typewriting, the microcapsules rupture in the region under pressure. The colorless chromogenic compound released from the ruptured microcapsules is transferred to the receiving paper and reacts with the electron-accepting material to form a definite colored mark.

A variant form of such pressure-sensitive copy paper consists of a sheet on which microcapsules containing a chromogenic compound dissolved in an oil are intermixed with microcapsules containing an electron-accepting material. Examples of such pressure-sensitive copy papers and microcapsules are described in U.S. Pat. Nos., 2,712,507; 2,730,456; 2,730,457 and 2,800,457.

Another variant form of such pressure-sensitive copy paper consists of a sheet on which microcapsules containing a chromogenic compound dissolved in an oil are coated on a substrate and dried, followed by a second coating containing an electron-accepting material. An example of such a pressure-sensitive copy paper is described in U.S. Pat. 3,906,123. Pressure-sensitive copy papers comprising colorless, chromogenic compounds and acidic receptor materials on the same surface are known as "self-contained" systems.

When organic acid compounds or metal salts of organic acid compounds have been used as an acidic receptor in coatings for pressure-sensitive copy systems they generally are provided in a finely dispersed form, either by grinding the organic material together with an extender or by precipitating it in the presence of an extender. It is important that the organic acid receptor material be extended with an inert or adsorbent particulate filler, usually an inorganic filler such as clay or alumina, to make the most efficient use of the relatively costly organic material and to present a large surface area for reaction with the oily solution of basic chromogenic comound to facilitate rapid color development. In one instance, the organic acidic material has been extended by dissolving it in finely divided organic polymeric particles, in contrast to the inorganic extenders commonly used.

A process for making an activated, clay-coated paper for use as a pressure-sensitive copy paper is described in U.S. Pat. No. 3,928,702. Acidic activated clay is mixed with a water-dispersible emulsion of a hydrophobic oily material. This patent is concerned with making the non-chromogenic acid in the clay more accessible to colorless, electron-accepting, chromogenic material contained either in microcapsules or on an independent layer.

It is an object of this invention to provide a uniform distribution of acid organic acceptor material on an inert or reactive adsorptive, particulate extender. It is a further object of this invention to provide a means for dispersing and extending soft, amorphous, oily or tacky organic acid acceptor materials which would be incompatible or more difficult to process with a grinding or precipitation method of dispersion.

In addition to pressure-sensitive copy systems, the resulting emulsions or dispersions also are useful in coatings for heat-sensitive and stencil copy systems using colorless, chromogenic compounds.

SUMMARY OF THE INVENTION

The present invention is a process wherein an acidic, organic acceptor material, such as an organic acid compound or a metal compound thereof, capable of developing an intense persistent color when brought into contact with a colorless, basic chromogenic material, is dissolved in an oily, water-immiscible liquid, after which the oily solution is emulsified in water to form an oil-in-water emulsion. An insoluble, oil-adsorbant particulate solid is dispersed in the oil-in-water emulsion, and the resulting emulsion-dispersion is coated on a substrate or is mixed with other coating materials and dried to produce a highly reactive, color-developer coating.

In an alternative embodiment of the invention, the oil-in-water emulsion is mixed with a reactive particulate material which is capable of reacting with the organic acid material of the metal compound of the organic acid compound in the emulsion droplets to form an improved color developer. The resulting emulsion-dispersion optionally may be further extended with an inert or reactive, oil absorbent particulate extender before formulating into a coating for a pressure sensitive copy system.

One advantage of the present invention is that soft, amorphous, oily or tacky materials which are not suitable for grinding or precipitation methods of dispersion can be easily dispersed to form dry, non-tacky coatings. Another advantage is that the fluid emulsion droplets can flow onto the surface of the particulate extender, giving uniform surface coverage to facilitate rapid color development. Crystals or amorphous particles produced by grinding or precipitation, or solutions of organic acid reporter materials dissolved in a polymeric matrix may, in some cases, develop color from basic, chromogenic compounds more slowly without the great surface area for reaction provided by the present invention. Moreover, persistent oily solvents retained in the coating can facilitate the rapid mixing of acidic and base color-forming reactants. A further advantage of the present invention is that an improved color developer, such as the metal salt of an acidic organic compound can be formed "in situ" by reaction of the oil-in-water emulsion droplets with a reactive particulate material, thereby eliminating the isolation of the improved color developer before formulation into a receptor coating in a pressure-sensitive copy system. In particular, the coating of the present invention requires only standard mixing equipment for its preparation and is particularly easy to formulate and coat, as it requires no special materials, processing or coating steps.

DETAILED DESCRIPTION OF THE INVENTION

The first step in preparing a color-developer coating in accordance with this invention is the dissolution of an acidic organic material in an oily, water-immiscible liquid.

Examples of suitable acidic organic materials which are soluble in oily, water-immiscible liquids are widely available in the literature and include organic carboxylic acids, such as those described in U.S. Pat. Nos. 3,488,207 and 3,843,383; metal salts of organic carboxylic acids, such as those described in U.S. Pat. Nos. 3,843,383; 3,900,215; 3,682,680 and 3,864,146; metallic compounds of polymers of organic carboxylic acids, such as those described in U.S. Pat. Nos. 3,772,052 and 3,767,449. Also suitable are phenolic compounds, such as those described in U.S. Pat. Nos. 3,244,550 and 3,244,548; metallic compounds with phenolic materials such as those described in U.S. Pat. No. 3,834,929; acidic phenolic polymer resins, such as those described in U.S. Pat. Nos. 3,455,721; 3,672,935; 3,663,256; 3,466,184; 3,649,357 and 3,694,461; or metallic compounds of phenolic organic polymeric resins such as those described in U.S. Pat. Nos. 3,723,156 and 3,723,120. Mixtures of two or more oil-soluble, acidic materials can also be used.

Specific examples of suitable acidic materials include substituted salicylic acids such as hexadecylsalicylic acid, 5-tert-octylsalicylic acid, 3,5-di($\alpha$,$\alpha$-dimethylbenzyl) salicylic acid, 3,5-dichlorosalicylic acid, 3,5-diisopropylsalicylic acid; substituted hydroxynaphthoic acids such as 7-($\alpha$,$\alpha$-dimethylbenzyl)-1-hydroxynaphthoic acid, 4,7-diisopropyl-1-hydroxy-2-naphthoic acid, 6,8-dioctyl-2-hydroxy-3-naphthoic acid and other hydroxy naphthoic acids such as 1-hydroxy-2-naphthoic acid, 2-hydroxy-1-naphthoic acid and 3-hydroxy-2-naphthoic acid; polymers of salicylic acid and salicylic acid derivatives with an aldehyde or an acetylene; phenols; such as 4,4'-isopropylidenediphenol, xylenol, dichlorobiphenol, alkylated 2-naphthol, nonylphenol and the like; phenol aldehyde condensation polymers derived from cresol, 4,4'-isopropylidenediphenol, paraphenylphenol and the like.

These materials may be used alone or in combination with a metal ion such as those derived from zinc, calcium, aluminum, titanium, magnesium, vanadium, zirconium, manganese, nickel, cobalt, iron, copper and tin.

The oily, water-immiscible material can be any oil in which the selected acidic material is soluble. Examples of suitable oils include aromatic, naphthenic and paraffinic oils, esters, ketones, chlorinated hydrocarbons, mineral oils, phosphate esters and the like, and mixtures thereof.

Specific examples include aromatic oils, such as toluene, xylene, other alkylated biphenyls, terphenyls, diphenylmethanes and the like, naphthenic and paraffinic oils and oil blends, motor and lubricating oils, esters such as phthalate esters, fatty esters, adipate esters, phosphate esters, such as tricresyl phosphate, polyhalogenated biphenyls, polychlorinated paraffins and the like.

The second step in the process is the emulsification of the oily solution of acidic material in water by mixing it under shear with an emulsifying agent to form an oil-in-water emulsion. The emulsifying agent can be a polymeric material such as polyvinyl alcohol, gelatin, starch, cellulose esters or ethers, gums and the like. The emulsifier may also serve as a binding agent to help adhere the acidic coating to a substrate or other receptor. Depending on the binding properties of the emulsifier, a supplementary adhesive may have to be added to the solution. Alternatively, the emulsifying agent can be a non-adhesive surfactant or emulsifier suitable for promoting a stable oil-in-water emulsion. Where such surfactants or emulsifiers are used, a supplementary adhesive is required to promote binding of the coating to a substrate.

Examples of suitable polymeric emulsifiers having adhesive properties are polyvinyl alcohol, starches, modified starches such as benzylated starch, methylcellulose, sodium carboxymethyl cellulose, hydroxyethyl cellulose, styrene maleic anhydride copolymers, gelatins other animal and vegetable proteins, gums such as gum arabic, alginates and the like.

Examples of suitable surfactants and emulsifiers which promote the formation of oil-in-water emulsions, but lack adhesive properties, are anionic surfactants, such as salts of sulfate and phosphate esters, sulfonates and the like, and nonionic surfactants, such as poly(oxyethylene) derivatives of phenols, alcohols, carboxylic acid derivatives and the like.

An emulsion-dispersion is then formed by thoroughly dispersing an oil-adsorbent particulate material in the emulsion.

Commercially available oil-adsorbent, particulate materials may be utilized in the practice of the present invention. Examples of suitable particulate materials include typical paper coating pigments such as clays, for example, kaolin, montmorillinite and attapulgite clays, heat-treated clays, talc, calcium carbonate, zinc oxide, aluminum oxide, satin white, calcium sulfide and the like. Mixtures of the above materials are also suitable.

It was found that highly acidic particulate extenders, such as attapulgite clay and calcined alumina, which themselves react with the basic, colorless chromogenic compounds to give a colored species and are suitable alone for use in pressure-sensitive copy systems of this type, actually produce less color when used in conjunction with an oily solution of acidic organic material of the invention than inert extenders when used in conjunction with the same oily solutions of acidic organic material. Moreover, in comparison with inert particulate extenders, images formed with coatings containing these acidic, reactive extenders had reduced resistance to heat and light, the coatings losing some of their color-developing activity when exposed to heat or light. Presumably the highly reactive surface of such extenders contribute to decomposition of the organic acid components of the developer coating.

When the oil-adsorbent material is dispersed in the emulsion, the oily solution of acidic material in the emulsion droplets readily transfers to the particles upon contact since the oily solution is not protected by a substantially impermeable membrane as would be the case for an encapsulated oil droplet. It is theorized that the oily solution is transferred to the particulate material either immediately upon mixing or upon drying to form a color-developer coating. Once the transfer has been accomplished, the oily solvent may either remain as a residual component of the receptor sheet or be removed through evaporation, leaving the acidic material adsorbed on the particulate substrate. Oily solvent remaining in the receptor sheet can be expected to promote mixing of the color-forming components.

Alternatively, instead of emulsifying an oily solution of a metal salt of an organic acidic compound, the metal salt can be formed "in situ" by adding to the emulsion of the oily solution of acidic organic compound a metallic compound capable of reacting with the organic compound to form a metal salt. Thus, a particulate or colloidal metal oxide, hydroxide or carbonate, for example, can be added to the oil-in-water emulsion where it can come into contact with the acidic organic compound to form a metal salt which gives a stronger and more stable color reaction with the basic, chromogenic compound than the parent organic acid itself.

The preceding description indicates that the oil-adsorbent, particulate material is added after the oily solution of acidic material is emulsified in an aqueous solution of the emulsifying agent. However, if desired, the particulate material can be combined with either the oily solution of acidic material or with the emulsifying agent before the two are mixed under shear.

Acidic coatings prepared according to the above-described steps can be used in a number of ways. Such coatings may be used in conjunction with coatings containing microcapsules of an oily solution of colorless, basic, chromogenic material to form a carbonless record system in which the two types of coating are applied to opposite sides of paper substrates. The paper substrates are mated to form a pressure-sensitive, mark-forming manifold. Alternatively , the new acidic coating may be deposited on a coating containing encapsulated colorless, basic, chromogenic compound to form a self-contained carbonless record system or such a self-contained system may be produced by depositing a coating of encapsulated, colorless basic chromogenic material over an acidic coating prepared in accordance with the present invention. In another embodiment, microcapsules containing and completely isolating a colorless, basic, chromogenic material may be added to the emulsion-dispersion during one step in the process to form a self-contained coating material.

When localized pressure is applied to a pressure-sensitive sheet or manifold having the acidic coating, the oily solution of colorless, chromogenic material is released from ruptured capsules in the region under pressure. The chromogenic material reacts with the acidic material adsorbed on the particulate material to form a persistent, colored mark.

Alternatively, oily droplets containing the acidic material may be entrapped in the binder matrix of the dry receptor coating. The oily droplets would be released under pressure in a pressure-sensitive, carbonless, record system and would be co-adsorbed with the oily solution of chromogenic material on the particulate oil-adsorbent material of the receptor coating. In any case, the particulate oil-adsorbent material provides a substrate for intimate mixing of color-forming components.

Examples of basic chromogenic materials include leuco triarylmethane dyes such as 3,3-bis(p-dimethylaminophenyl) 6-dimethylaminophthalate (crystal violet lactone), 3,3-bis(p-dimethylaminophenyl) phthalide (malachite green lactone), 3-(p-dimethylaminophenyl)-3-(1,2-dimethylindol-3-yl) phthalide, 3-(p-dimethylaminophenyl)-3-(2-phenylindol-3-yl) phthalide 3,3-bis(1,2-dimethylindol-3-yl)-5-dimethylaminophthalide, 3,3-bis (1,2-dimethylindol-3-yl)-6-dimethylaminophthalide, 3,3-bis (9-ethylcarbazol-3-yl)-5-dimethylaminophthalide, 3-p-dimethylaminophenyl-3-(1-methylpyrrol-2-yl)-6-dimethylaminophthalide, 7-(1-ethyl-2-methylindol-3-yl)-7-(3-ethoxydiethylaminophen-4-yl)-5,7-dihydrofuro [3,4-b] pyrazin-5-one, 3-(p-dimethylaminophenyl)-3-(1-methylpyrrol-2-yl)-4,5,6,7-tetrachlorophthalide, 7-(1-ethyl-2-methylindol-3-yl)-7-(3-methyldimethylaminophen-4-yl), 5,7-dihydrofuro [3,4-b] pyridin-7-one, 3-(4-diethylaminophenyl)-3-(1,2-dimethylindol-3-yl) naphthalide; diphenylmethane compounds such as leuco auramine, N-halophenyl leuco auramine, 4,4'-bis-dimethylaminobenzhydrine benzyl ether; xanthene compounds such as rhodamine B lactam, rhodamine B-(p-chloroanilino) lactam, 7-dimethylamino-2-mathoxyfluoran, 2,2'-iminobis (6-dimethylaminofluoran), 3-diethylamino-7-(N'-paramethoxyphenyl)-piperazinofluoran, 2'-[N-(carbethoxymethyl)amino]-6'-diethylaminofluoran, 6'-diethylamino-2'-[N-(N'-dimethylcarbamoyl)methlamino] fluoran, 6'-diethylamino-2'-(p-nitrobenzenesulfonamido) fluoran; spiropyran and benzopyran compounds such as 3,3'-dichlorospiro-dinaphthopyran, 3-benzyl-spiro-dinaphthopyran, 3-propyl-spiro-dibenzopyran, 2-(2,5-dichloroanilino)-2-(p-methoxyphenyl)-2(H) benzopyran, 5-dimethylamino-spiro-[isofuran-1(3H)-2'(2H)]-1-benzopyran-3-one; acridan dyes such as 9-(p-dimethylaminophthalyl-3)-10-methylacridan and others, including benzoyl leuco methylene blue. Mixtures of colorless, basic chromogenic compounds are also suitable for use with the coating of the invention.

DESCRIPTION OF SPECIFIC EMBODIMENTS

The following examples are intended to exemplify the actual practice of the present invention without limiting the scope of the invention. Unless otherwise noted, all percentages and parts are by weight.

EXAMPLE 1

A coating emulsion-dispersion was prepared as follows: 9.1 grams of zinc alkyl salicylate (alkyl = $C_{16}$ - $C_{18}$ mixture) formed be the reaction of the corresponding alkyl salicylic acid with zinc acetate in xylene, were dissolved in 40.9 grams of an oil comprising a mixture of mono- and diisopropylnaphthalenes. This oil solution then was emulsified, using a blender, in 36.7 grams of 7% aqueous solution of a high molecular weight, 87% hydrolyzed Covol 9740 poly(vinyl alcohol), CPC International. 35 grams of water were blended in, and 36.4 grams of kaolin clay were dispersed in the emulsion. An additional 3 grams of 7% poly(vinyl alcohol) solution were blended in to complete the emulsion-dispersion. The acidic receptor sheet was formed by coating the emulsion-dispersion on paper using a Mayer rod and drying to provide a 2.9 lb./ream (3300 sq. ft.) coating.

This coating exhibited rapid and intense color development when pressure mated with a sheet coated with a microencapsulated oil solution of a basic colorless chromogenic material (crystal violet lactone). The acidic receptor sheet showed no loss of activity after accelerated aging at 100° C. for 18 hours. The developed crystal violet lactone image exhibited excellent fade resistance to the action of atmosphere and light.

EXAMPLE 2

A coating emulsion-dispersion was prepared as follows: 9.1 grams of zinc alkyl salicylate (alkyl = $C_{16}$ - $C_{18}$ mixture) was dissolved in 40.9 grams of an oil comprising a mixture of mono- and diisopropylnaphthalenes. This oil solution was emulsified using a blender, in 107 grams of a 7% solution of Covol 9740 poly(vinyl alcohol). Then, 36.4 grams of kaolin clay and 35 grams of water were blended in to complete the emulsion-dispersion. The emulsion-dispersion was coated on paper as described in Example 1 and dried. The resulting product was substantially indistinguishable from that described in Example 1.

EXAMPLE 3

Ten grams of zinc alkyl salicylate (alkyl = $C_{16}-C_{18}$ mixture) were dissolved in 35 grams of xylene. This solution was emulsified, using a blender, in 107 grams of a 7% solution of Covol 9740 poly(vinyl alcohol). Next 36.4 grams of kaolin clay and 85 grams of water were blended in. This emulsion-dispersion was coated onto paper using a Mayer rod and dried to provide a 2.5 lb./ream coating.

This coating exhibited rapid and intense color development when pressure mated with a sheet coated with a microencapsulated oil solution of a basic colorless chromogenic dye precursor (crystal violet lactone). The sheet showed no loss of activity after accelerated aging at 100° C. for 18 hours. The developed crystal violet lactone image exhibited excellent fade resistance to the action of atmosphere and light.

EXAMPLE 4

7.0 grams of phenolic novolak resin were dissolved in 38 grams of oil of the type used in Example 1. This solution was emulsified in 107 grams of 7% solution of Covol 9740 poly(vinyl alcohol). The emulsion was mixed with 36.4 grams of kaolin clay and 100 grams of water. This emulsion-dispersion was coated onto paper using a Mayer rod and dried to give a coating of 3.0 lb./ream.

The resulting product exhibited color development when pressure mated with a sheet coated with a microencapsulated oil solution of crystal violet lactone. The coating showed little loss of activity after accelerated aging at 100° C. for 18 hours. The developed crystal violet lactone image exhibited excellent fade resistance to the action of atmosphere and light.

EXAMPLE 5

Benzoic acid in an amount of 12.2 grams was heated with 11.9 grams of zinc acetate dihydrate in an oil mixture of 85 grams of oil described in Example 1 with 50 grams of xylene. 18.5 grams of a phenolic novolak resin were added and the mixture was heated at reflux, allowing the xylene to distill off, with the pot reaching a temperature of about 165° C. 45 grams of the resulting mixture were emulsified, using a blender, in 53 grams of a 7% solution of Covol 9740 poly(vinyl alcohol). 35.0 grams of water and 36.4 grams of heat-treated kaolin clay were blended in to complete the emulsion-dispersion. This emulsion-dispersion was coated on paper using a Mayer rod and dried to give a 2.4 lb./ream coating.

The product exhibited rapid and intense color development when pressure mated with a sheet coated with a microencapsulated oil solution of crystal violet lactone. The acidic receptor sheet showed no loss of activity after accelerated aging at 100° C. for 18 hours. The developed crystal violet lactone image exhibited excellent fade resistance to the action of atmosphere and light.

EXAMPLE 6

A coating emulsion-dispersion is prepared as in Example 1. Then, 100 grams of a slurry containing encapsulated crystal violet lactone, which had been prepared as disclosed in U.S. Pat. No. 2,800,457 are added to 100 grams of the emulsion-dispersion. The combined emulsion-slurry was coated onto a substrate and dried to provide a substantially colorless, self-contained record sheet which, under the force of pressure from a scribe or typewriter, exhibited rapid and intense color development and showed little loss of activity after accelerating aging at 100° C. for 3 hours. The developed crystal violet lactone image exhibited excellent fade resistance to the action of atmosphere and light.

EXAMPLE 7

The emulsion-dispersion of Example 1 was coated onto a substrate previously coated with microcapsules containing crystal violet lactone, and was dried. The resulting product was a self-contained, pressure-sensitive record system which exhibited rapid and intense color development under pressure and showed little loss of activity of development of premature coloration after accelerated aging at 100° C for 3 hours.

EXAMPLE 8

6 grams of a 64 percent solution of hexadecysalicylic acid in xylene were emulsified in 100 milliliters of a 1.4 percent solution of a high-molecular weight, 87 percent hydrolyzed Covol 9740 poly(vinyl alcohol.) While maintaining agitation, a slurry of 3 grams of zinc carbonate in 10 milliliters of water was added, and the emulsion-dispersion then was heated for about ½ hour to distill off the xylene as an aqueous azeotrope and to promote reaction between the alkylsalicylic acid and zinc carbonate. 20 grams of paper coating grade of hydrated alumina were added to the cooled emulsion-slurry, followed by 10 grams of 50 percent solids latex adhesive. This receptor coating was coated on paper to give an acid receptor sheet. At a dry coat weight of 3.2 pounds/ream, this sheet exhibited excellent image developing capabilities when pressure mated with a sheet coated with microcapsules containing an oily solution of crystal violet lactone. The image resisted fading when exposed to heat and light, and the receptor sheet retained its color-developing capabilities under the same conditions.

EXAMPLE 9

The procedure of Example 8 was repeated using 3 grams of zinc oxide in place of the zinc carbonate. The coating showed the same excellent capability for developing color with crystal violet lactone and, in addition, showed exceptional resistance of the developed image to fading when exposed to fluorescent light.

EXAMPLE 10

The procedure of Example 8 was repeated using 3 grams of zinc oxide in place of the zinc carbonate and 20 grams of flux calcined diatomaceous earth in place of the hydrated alumina. The coating showed the same excellent capability for developing color with crystal violet lactone and, in addition, showed exceptional resistance of the developed image to fading when exposed to fluorescent light.

While preferred embodiments of the invention have been described in detail, variations and modifications thereof will occur to those skilled in the art once they become acquainted with the basic concepts of the invention. Therefore, it is intended that the appended claims shall be construed to include all such variations and modifications as fall within the true spirit and scope of the invention.

What is claimed is:

1. A process for preparing a color-developer coating which comprises mixing an oily solution of an acidic organic acceptor material capable of developing a color when contacted with a basic chromogenic material in a water-immiscible organic liquid, an aqueous solution of an emulsifier, and an insoluble, particulate, oil-adsorbent extender to form an emulsion-dispersion comprising a dispersion of said particulate oil-adsorbent extender in an oil-in-water emulsion of said oily solution in said aqueous solution.

2. A process as recited in claim 1 wherein said oily solution of acidic organic acceptor material is mixed under shear with the aqueous solution of emulsifier to form said oil-in-water emulsion prior to the addition of said insoluble, particulate, oil-adsorbent extender.

3. A process as recited in claim 1 wherein said insoluble, particulate, oil-adsorbent extender is admixed with said aqueous solution of emulsifier prior to the addition of said oily solution of acidic organic acceptor material.

4. A process recited in claim 1 wherein said insoluble, particulate, oil-adsorbent is admixed with said oily solution of acidic organic acceptor material prior to mixing with the aqueous solution of emulsifier.

5. A process as recited in claim 1 including the further step of adding a supplementary adhesive material to said emulsion-dispersion.

6. A process as defined in claim 1 wherein said insoluble, particulate, oil-adsorbent extender is inert with respect to said acidic organic acceptor material.

7. A process as defined in claim 1 wherein said insoluble, particulate, oil-adsorbent extender is reactive with said acidic organic acceptor material.

8. A process for preparing a color-developer coating which comprises mixing an oily solution of an acidic organic acceptor material in a water-immiscible organic liquid, an aqueous solution of an emulsifier, and a particulate reactive compound capable of reacting with said acidic organic material to form a dispersion of the reaction product in an oil-in-water emulsion of said oily solution in said aqueous solution.

9. A process as recited in claim 8 wherein said reactive compound is admixed with said oily solution of acidic organic material prior to emulsification in the aqueous solution of emulsifier.

10. A process as recited in claim 8 wherein an insoluble, particulate, oil-adsorbent extender is added to said mixture to form a dispersion of said particulate, oil-adsorbent extender in said mixture.

11. A process as defined in claim 10 wherein said insoluble, particulate, oil-adsorbent extender is inert with respect to said acidic organic acceptor material.

12. A process as defined in claim 10 wherein said insoluble, particulate oil-adsorbent extender is reactive with said acidic organic acceptor material.

13. A coating product prepared by mixing an oily solution of an acidic organic acceptor material in a water-immiscible organic liquid, an aqueous solution of an emulsifier, and an insoluble, particulate, oil-adsorbent extender to form a dispersion of said particulate, oil-adsorbent extender in an oil-in-water emulsion of said oily solution in said aqueous solution.

* * * * *